(12) United States Patent
Pinera et al.

(10) Patent No.: US 7,171,661 B1
(45) Date of Patent: Jan. 30, 2007

(54) REALTIME CONFIGURATION UPDATES AND SOFTWARE DISTRIBUTION TO ACTIVE CLIENT POSITIONS

(75) Inventors: Carlos V. Pinera, Boca Raton, FL (US); Paul G. Ringhof, Boca Raton, FL (US); Jeff Slutzky, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 09/691,968

(22) Filed: Oct. 19, 2000

(51) Int. Cl.
G06F 9/44 (2006.01)
G06F 15/16 (2006.01)

(52) U.S. Cl. ............... 717/172; 709/202; 709/203
(58) Field of Classification Search ........ 717/172, 717/171, 173, 176–178; 709/203, 217, 219
See application file for complete search history.

(56) References Cited

U.S. PATENT DOCUMENTS

| | | | | |
|---|---|---|---|---|
| 5,752,042 A | * | 5/1998 | Cole et al. | 717/173 |
| 5,920,725 A | * | 7/1999 | Ma et al. | 717/171 |
| 5,960,204 A | * | 9/1999 | Yinger et al. | 717/176 |
| 6,029,196 A | * | 2/2000 | Lenz | 709/221 |
| 6,074,434 A | * | 6/2000 | Cole et al. | 717/173 |
| 6,123,737 A | | 9/2000 | Sadowsky | 717/11 |
| 6,151,643 A | * | 11/2000 | Cheng et al. | 710/36 |
| 6,167,567 A | * | 12/2000 | Chiles et al. | 717/173 |
| 6,202,207 B1 | * | 3/2001 | Donohue | 717/173 |
| 6,301,710 B1 | * | 10/2001 | Fujiwara | 717/175 |
| 6,314,088 B1 | * | 11/2001 | Yamano | 370/254 |
| 6,408,434 B1 | * | 6/2002 | Fujiwara | 717/170 |

FOREIGN PATENT DOCUMENTS

| | | |
|---|---|---|
| EP | 0809183 | 11/1997 |
| EP | 0969359 | 1/2000 |
| JP | 04-175952 | 6/1992 |
| JP | 08-095760 | 4/1996 |

OTHER PUBLICATIONS

"JNDI Java Naming & Directory Interface™," Jan. 1998, JavaSoft, pp. 1-2.*
V. Ryan, et al., "Schema for Representing Java™ Objects in an LDAP Directory," Oct. 1999, Sun Microsystems, Inc., RFC 2713, pp. 1-21.*
Andrew S. Tanenbaum, "Computer Networks," 1996, Prentice Hall PTR, 3$^{rd}$ ed., pp. iii, iv, 36-37, 542.*

* cited by examiner

Primary Examiner—Tuan Dam
Assistant Examiner—Eric B. Kiss
(74) Attorney, Agent, or Firm—Akerman Senterfitt

(57) ABSTRACT

A system for updating active client positions can include a platform for managing active application components; a configuration server for storing updates; and, a configuration client for receiving updates from the configuration server and communicating the received updates to the platform. The platform can receive the updates from the configuration client. Subsequently, the platform can terminate selected ones of the active application components. Then, the platform can apply the received updates to the terminated application components. Finally, the platform can reload the updated application components.

27 Claims, 4 Drawing Sheets

REALTIME CONFIGURATION UPDATES AND SOFTWARE DISTRIBUTION TO ACTIVE CLIENT POSITIONS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates to the field of client server applications and the distribution of application updates. More particularly, the instant invention relates to a method and apparatus for distributing application updates while a host platform for the application is still active.

2. Description of the Related Art

In typical computing environments, there is often a need to provide an automated method for distributing software from a server to one or more client applications. Computing environments are typically composed of one or more servers which provide localized or specialized services to one or more clients. These distributed environments result in information being spread across various heterogenous data stores. One of the consequences of having information spread across heterogeneous data stores is that data can easily be duplicated. However, spurious duplication often results in inconsistent updating.

Various methods have been employed to provide an efficient solution for performing operations on data in a distributed computed environment. In particular, operations can include, locating, adding, deleting, and modifying the data. One solution involves utilizing a directory service acting as a central repository for storing all data within an environment. In this solution, the directory service is the single point from which the data contained therein is manipulated.

The use of a directory service for storing and accessing data in a distributed environment can be advantageous in several respects. A directory service provides a single central resource for managing resources that may be localized as in a local area network (LAN), or distributed as in a wide area network (WAN). Additionally, since there is only a single central repository, resources within the environment can be replicated to ensure peak performance and also for redundancy purposes.

Since the directory service defines a single format for storing data, other applications having disparate storage formats can, through a single interface, communicate with the directory service. Since the single open format allows interoperability among various vendors, applications from other vendors can easily be shared with the directory service. Moreover, the single format is flexible enough that it can easily be extended to permit future growth that might occur as a result of technical advances or simply due to a need to scale the size of the operating environment.

Given these advantages, several directory service technologies have been created to access data stores. Among these methodologies is a Lightweight Directory Access Protocol (LDAP). LDAP defines a model for storing entries in a directory service and a method for accessing these entries in a directory service. LDAP provides access to the directory service through the use of a TCP/IP connection. The data stored in a directory service can include, but is not limited to, user information, application updates and configuration information.

An entry is the basic data unit entity in the LDAP technology. An entry is an object that contains persistent information about a specific resource. Each entry has a unique identifier referred to as a distinguished name (DN), and belongs to a directory information tree (DIT). Each entry of the LDAP is composed of a collection of attributes with each attribute defining some specific characteristic of the entry. Each attribute is associated with a specific value type.

Many attempts have been made to automate the distribution of software in the client-server environment. However, present solutions lack the capability to perform realtime application updates and software distribution to active applications without having to reboot the supporting platform. Additionally, present automated software distribution systems do not support realtime updates of configuration data without first shutting down all active applications and subsequently rebooting the platform. Thus, there exists a need for efficiently distributing application updates and configuration to a host platform while the host platform is still actively running other applications.

SUMMARY OF THE INVENTION

The present invention is a system, method and apparatus for distributing realtime updates to active application components in an active client position. A method in accordance with the present invention can include establishing a first communications connection between a platform managing the active application components and a configuration client; establishing a second communications connection between the configuration client and a configuration server; and, delivering updates to the configuration client over the second communications connection. Notably, each update can correspond to at least one particular application component.

Subsequently, the platform can be notified that updates have become available. Responsive to receiving such a notification, the execution of the particular active application components can be terminated. Following termination, each update can be delivered over the first communications connection to the platform, and each update can be applied to the particular application components. Finally, each updated application component can be re-executed.

In one aspect of the present invention, the termination step can include identifying the particular corresponding application component to be updated based on the notification; terminating instances of each identified application component; and, removing interdependencies between the terminated application component instances and other application components. Additionally, the re-executing step can include instantiating each updated application component; and initializing each updated application component instance. Moreover, the initializing step can include communicating configuration information to the configuration client; and reinitializing state information internal to each updated application component based on the configuration information. Finally, the method can further include requesting from the configuration client update notifications, the update notifications notifying the platform of application component updates as the updates become available in the configuration server.

In another aspect of the present invention, the method can further include transmitting update notifications over the second communications connection to the configuration client. In particular, the update notifications can notify the configuration client of application component updates as the updates become available in the configuration server. Additionally, the step of transmitting update notifications over the second connection can include packetizing the update notifications according to the User Datagram Protocol (UDP); and transmitting the UDP packets to the configuration client. That is, update notifications can be packetized into datagrams that can be conveyed from the configuration server to the configuration client. Finally, in yet another aspect of the present invention, the configuration server can be an LDAP server. Accordingly, the method can include storing the application component updates in an LDAP-based database in the LDAP server.

In yet another aspect of the method of the invention, a method for distributing realtime updates to active application components executing in an active client position can include first receiving updates to the active application components from a communicatively linked configuration client, wherein each update corresponds to at least one particular application component. Second, execution of each particular active application component having a received corresponding update can be terminated. Third, the received updates can be applied to the corresponding application components. Finally, the updated application components can be re-executed.

The terminating step can include terminating instances of each particular active application component having a received corresponding update; and removing interdependencies between the terminated application component instances and other application components. The re-executing step can include instantiating each updated application component; and initializing each updated application component instance. Finally, the method also can include subscribing to update notifications from the configuration client, wherein the update notifications notify the active client position of application component updates as the updates become available.

A system for updating active client positions can include a platform for managing active application components; a configuration server for storing updates; and, a configuration client for receiving updates from the configuration server and communicating the received updates to the platform. The platform can receive the updates from the configuration client. Subsequently, the platform can terminate selected ones of the active application components. Then, the platform can apply the received updates to the terminated application components. Finally, the platform can reload the updated application components.

In one aspect of the present invention, the configuration server can be an LDAP server. In another aspect of the present invention, the active application components can be instances of JAVA programming language classes (henceforth Java classes) classes. In yet another aspect of the present invention, the configuration client can include a notifier object and a listener interface. In consequence, the active application components can be configured to receive update notifications from the configuration client through the listener interface. Similarly, the configuration server also can include a notifier object and a listener interface. Likewise, the configuration client can be configured to receive update notifications from the configuration server through the listener interface.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
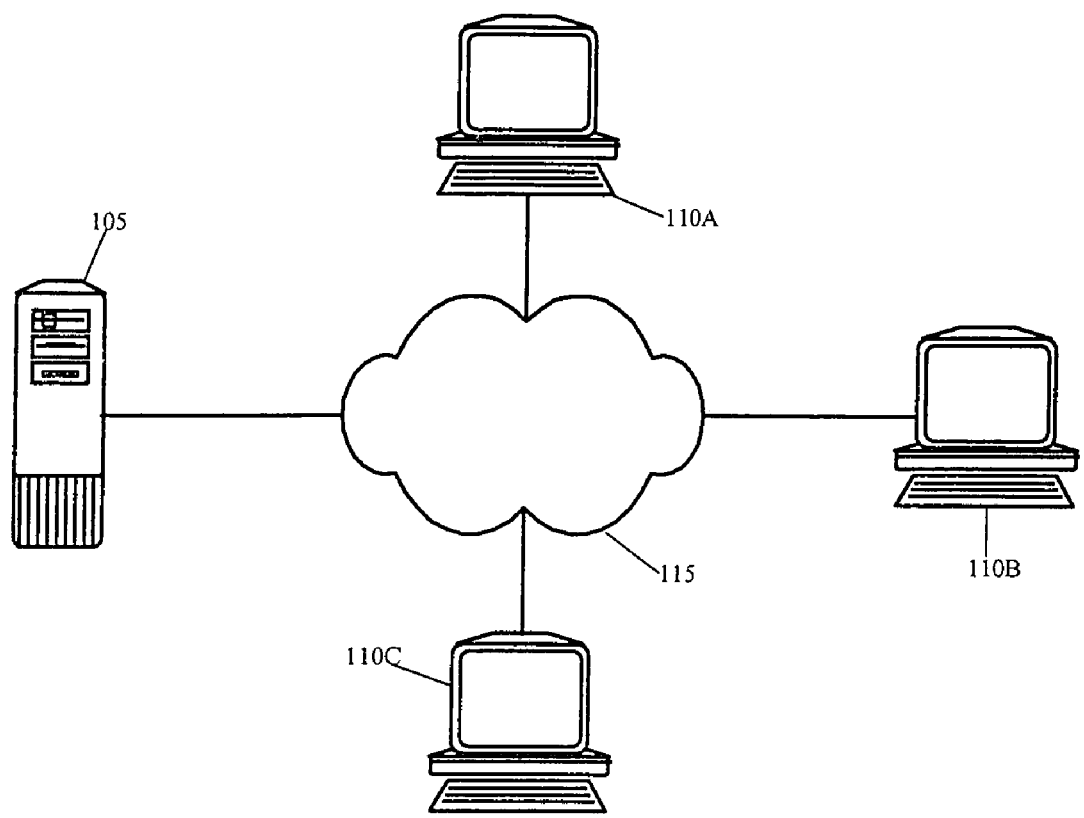
FIG. 1 is a high-level schematic illustrating a system for performing realtime configuration updates and software distribution to active client positions.

The present invention is a system for performing realtime configuration updates and software distribution to active client positions in a client-server environment. In particular, the system of the present invention can distribute software and configuration data to client positions without having to reboot each client position. FIG. 1 illustrates a network architecture configured for use with the system of the invention. As shown in FIG. 1, the system for performing realtime configuration updates and software distribution to active client positions can include a configuration server 105, a computer communications network 115, and a plurality of client positions 110A, 110B, 110C connected to the configuration server 105 through the computer communications network 115.

As each client position 110A, 110B, 110C undergoes bootstrap, a communications link can be established between the configuration server 105 and the client positions 110A, 110B, 110C. Subsequently, each booted client position 110A, 110B, 110C can query the configuration server 105 to identify the application components which are to be installed in the client position 110A, 110B, 110C. Upon identifying the application components, each client position 110A, 110B, 110C can install the identified application components.

Significantly, upon initialization each application component can request that the application component be notified of any future updates. When updates become available at the configuration server 105, messages can be broadcast to the client positions 110A, 110B, 110C notifying the positions of the update. In response, a communications link again can be established between affected client positions 110A, 110B, 110C. Subsequently, the updates, including configuration data and updated modules, can be retrieved through the communications link. Following retrieval, the application components to which the updates are to be applied can be terminated, updated and re-loaded. Notably, once re-loaded, the application components will have incorporated the updates. Hence, the system of the present invention can perform realtime application updates of application components in active client positions.

Figure 2:
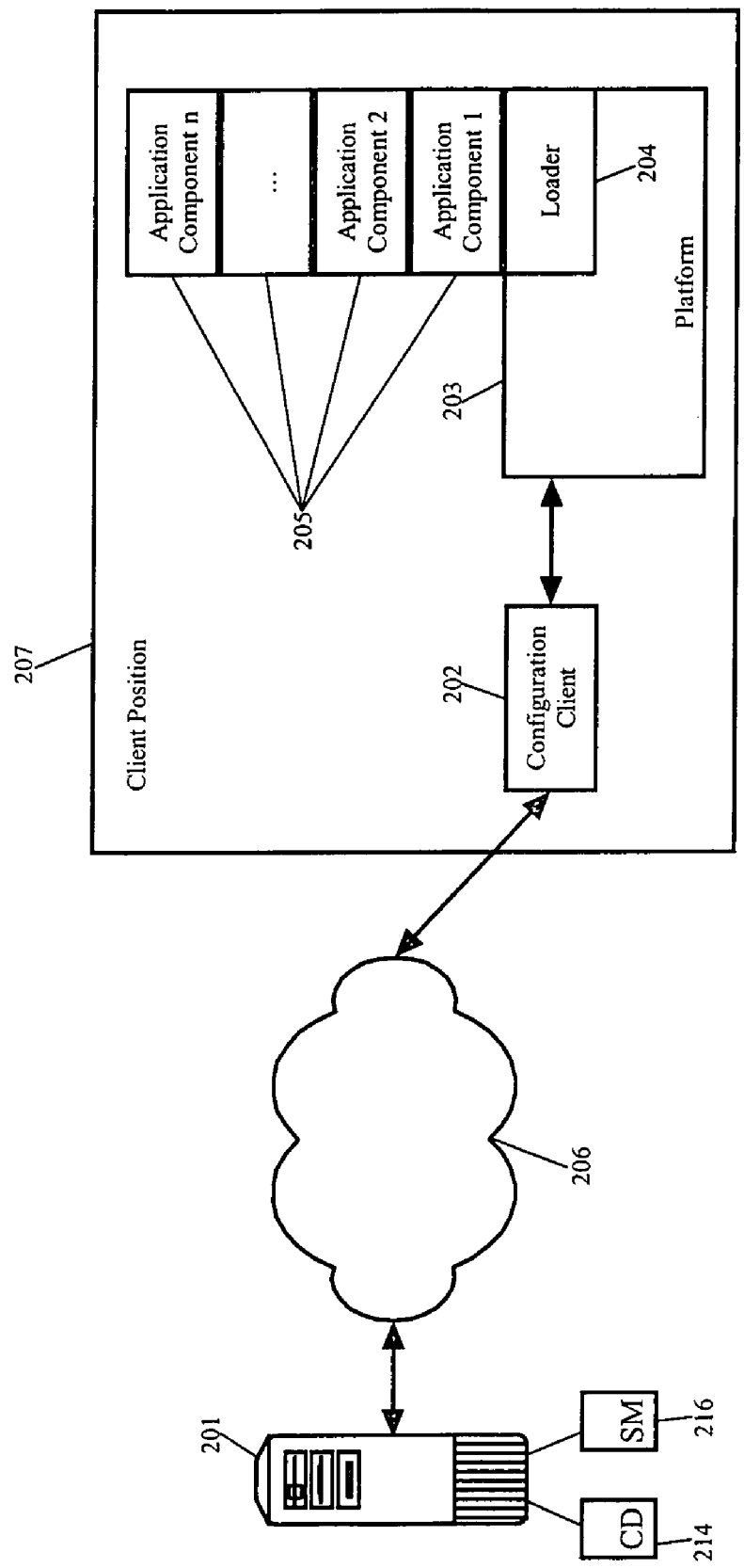
FIG. 2 is a network architecture diagram for use in the system of FIG. 1.

FIG. 2 depicts the interaction between a configuration server 201 and a single client position 207 through a network 206. The network 206 can be a LAN, WAN a data bus, or other suitable medium for communicatively linking distributed processes. As shown in the figure, the single client position 207 can include a configuration client 202, at least one application component 205, an application platform 203 for managing the application components 205, and an application loader 204 for loading and unloading the application components 205. Still, the invention is not limited in this regard and the configuration client 202 can be included as an application component external to the client position 207 in a distributed environment.

Notably, the invention is limited neither in the number of application components 205 managed by the platform 203, nor in the number of platforms 203 for managing the application components 205. Moreover, the loader 204 can be included as part of the platform 204 or can exist independently of the platform 203. Finally, the configuration client 202 can be included as an application component managed by the platform 203 along with the application components 205. The configuration server 201 can store both configuration data 214 and software modules 216 for distribution to the client positions. Specifically, the configuration server 201 can store the data 214 and modules 216 in an LDAP file server 210. However, the invention is not limited in this regard. Rather, the data 214 and modules 216 can be stored and accessed through any suitable means, for example an XML file server.

As shown in FIG. 2, the configuration client 202 can be managed separately from the platform 203. Moreover, in one aspect of the invention, the configuration client 202 can be implemented as a JAVA BEAN software object. In consequence, the configuration client 202 JAVA BEAN software object implementation can be reused by other applications. Notably, the platform 203 can be a JAVA programming language-based platform for managing application components 205. As such, the platform 203 can behave as an object request broker (ORB) for the various application components 205 installed on the platform 203.

In operation, when the client position 207 undergoes bootstrap, the platform 203 can start the configuration client 202. Once started, the configuration client 202 can read a bootstrap properties file containing only the uniform resource locator (URL) of the configuration server 201 and a client position identifier. Subsequently, the configuration client 202 can establish a communications connection to the configuration server 201. In particular, the communications connection can be an LDAP connection to an LDAP server using a JAVA Naming and Directory Interface (JNDI/LDAP). Still, the invention is not limited in regard to the particular communications connection. Rather, any suitable communications connection can suffice. For example, the communications connection can be a point-to-point TCP/IP connection to a CGI interface to a flat-file database using HTTP.

Once a communications connection has been established, the configuration client 202 can perform an initial inquiry of the configuration server 201 using the position identifier as the search argument. A response to the initial inquiry can include a list of application components 205 to be installed in the client position 207. Subsequently, the configuration client 202 can inspect the list and can perform secondary inquiries for each of application components 205 in the list. As before, secondary responses to the secondary inquiries can include executable modules for the application components 205 as well as configuration data that can include server addresses necessary for the execution of the application components 205.

The secondary responses can be received in the platform 203. Once received, the application components 205 can be executed. More particularly, the platform 203 can retrieve a list of each application component 205 to be installed in the client position 207. Subsequently, each application component 205 can be installed by performing appropriate instantiations and calling required initialization methods defined in a corresponding application component interface.

During initialization, each application component 205 can request corresponding configuration data from the configuration client 202. Examples of configuration data can include option settings, screen definitions, and server addresses. When received, the requesting application component 205 can perform an appropriate initialization. Each application component 205 also can request that the configuration client 202 notify the application component 205 of future updates for utilization by the application component 205. Notably, in one aspect of the invention the application component notification facility can include an implementation of an observer design pattern. Notwithstanding, the invention is not limited in this regard. Rather, other implementations of the application component notification facility can suffice, including storing a list of application components in a database and notifying selected application components each time an update is received which is directed to an application component in the list.

When updates become available in the configuration server 201, an update message can be transmitted to client positions 207 containing application components 205 to which the update is directed. Still, the invention is not limited in this regard. Rather, the messages can be broadcast messages or UDP narrow-cast messages directed to client positions 207 regardless of the application components 205 contained therein. In any case, once the configuration client 202 receives an update message, the configuration client 202 can establish a new communications connection to the configuration server 201. As before, the communications connection can be an LDAP connection where the configuration server 201 is an LDAP server. Subsequently, updates in the form of updated configuration data and software modules can be transmitted to the configuration client 202 through the communications connection.

Once the updated configuration data and software modules have been retrieved, the configuration client 202 can notify the platform 203 that updates have been received. For example, in a JAVA programming language or a C++ programming language implementation, the configuration client 202 can generate an update received event and transmit the same to the platform 203. In response, if updated software modules have been received, the platform 203 can identify application components to which the updates are directed. Where an update is updated configuration data which does not require the termination of the targeted application component 205, the platform 203 can simply deliver the update to the targeted application component 205. Specifically, the configuration client 202 can notify the targeted application component 205 that updated configuration data has been received. In response, the targeted application components 205 can retrieve the updated configuration data from the configuration client 202 and can reinitialize associated internal states appropriately.

In contrast, where an update is either an updated software module or updated configuration data which requires the termination and re-instantiation of the application component 205, the platform 203 can terminate the targeted application component 205 prior to applying the update to the targeted application component 205. In one aspect of the invention, the platform 203 can terminate the execution of the targeted application component 205 by accessing a terminate method associated with the targeted application component 205 and exposed by an interface to the targeted application component 205. Significantly, when applying an update to a targeted application component 205, a two-phased startup and shutdown approach can be implemented.

In consequence of this approach, application components 205 can remove any interdependencies without necessarily affecting program execution of other application components 205. Once the application component 205 has been terminated, the platform can apply the update according to configuration data associated with the update. Subsequently, the platform 203 can re-instantiate the targeted application component 205. Additionally, the platform 203 then can call the initialization method of the targeted application component 205 so that the targeted application component 205 can properly reload.

Figure 3A:
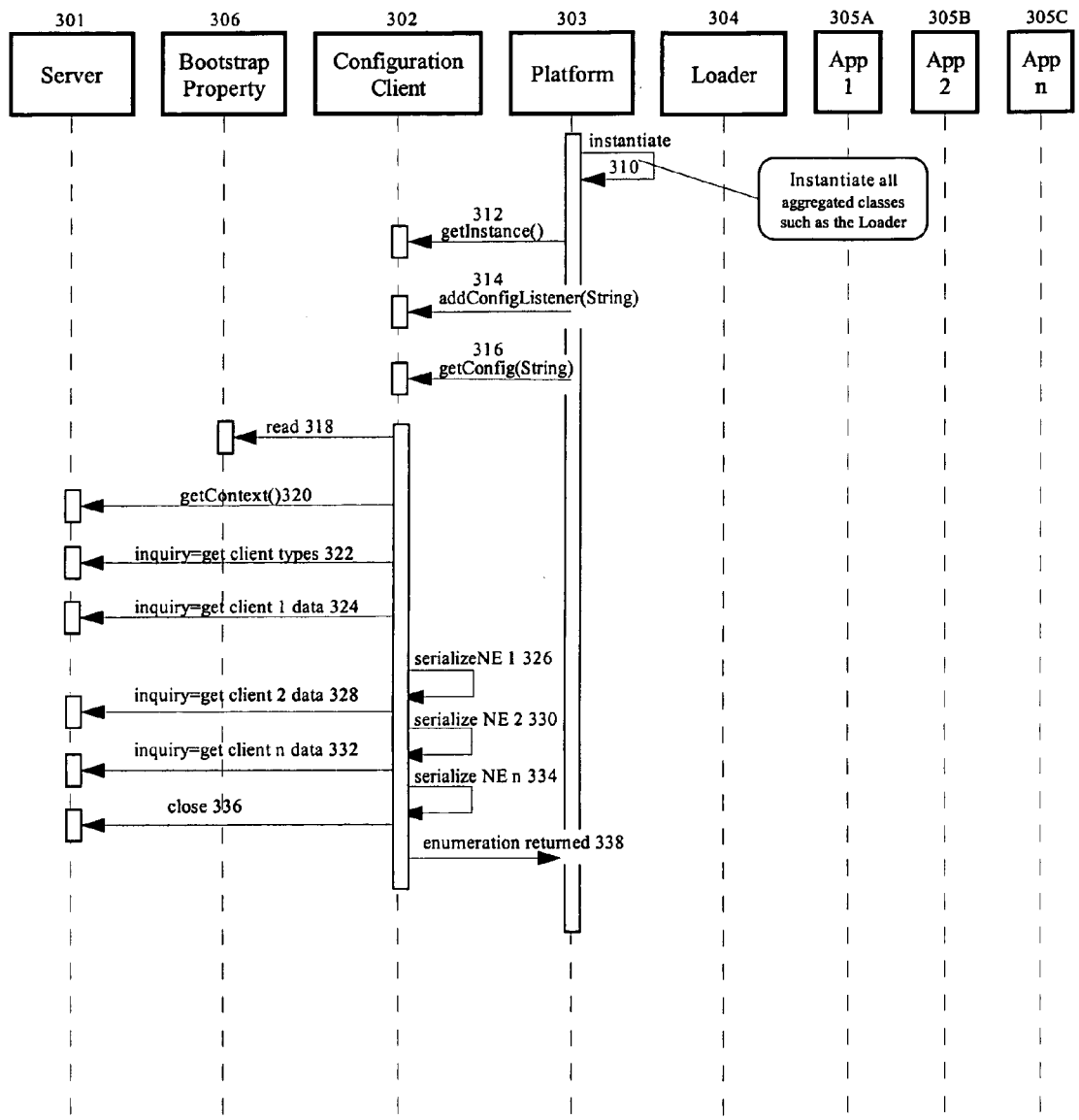
FIGS. 3A and 3B, taken together, are a UML sequence diagram illustrating a process for performing realtime configuration updates and software distribution to active client positions in the system illustrated in FIG. 2.
Figure 3B:
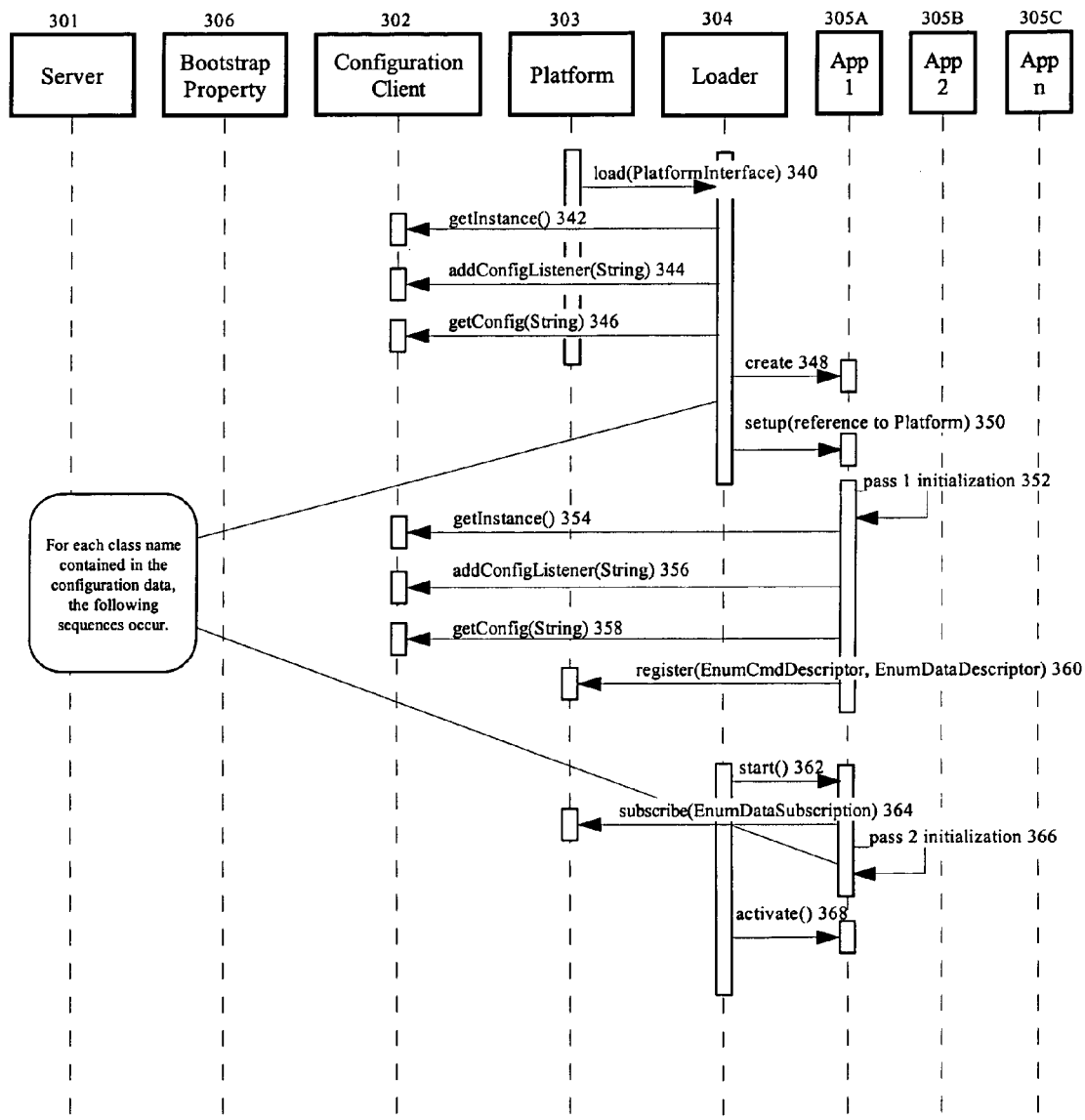

Turning now to FIGS. 3A and 3B, a communications sequence is illustrated in which the system of FIGS. 1 and 2 can be configured to distributed realtime updates to active client positions. As in FIGS. 1 and 2, the system can include a configuration server 301, a configuration client 302, a platform 303, a loader 304, and application components 305A–305C. Additionally, the system can include a bootstrap probe 306 for assisting the configuration client 302 during bootstrap.

Turning now to FIG. 3A, when the platform 303 undergoes bootstrap, the platform 304 can perform an instantiation 310 of the loader 304 and the configuration client 302. The platform 303 then can perform a series of runtime communication routines with the configuration client 302 such as getinstance( ) 312 to acquire a particular instance of the configuration client 302, addConfigListener(string) 314 to instruct the configuration client 302 to add the platform as a listener/observer and getConfig(string) 316 to retrieve configuration data. Once this initial phase of bootstrap has completed, the configuration client 302 can read 318 a bootstrap properties file and can extract therefrom an address for the configuration server 301. In one aspect of the invention, the bootstrap properties file can contain a URL of the configuration server 301 and a position identifier.

Once the bootstrap operation has completed, the configuration client 302 can establish a communications connection to the configuration server 301. In particular, where the configuration server 301 is an LDAP server, the configuration client 302 can establish an LDAP connection to the configuration server 301 using JNDI/LDAP. Subsequently, a getContext( ) method 320 can be used by the configuration client 302 to acquire the context of the configuration server 301. An initial inquiry then can be made to the configuration server 301 by the configuration client 302 to retrieve a list of client application component types. The initial inquiry 322 can use the position identifier of the configuration client 302 as a search argument.

In response to the initial inquiry 322, the configuration server 301 can return a response containing a list of client application component types to be installed in the platform 303. In one embodiment, a separate inquiry 324 can specify data within the configuration server 301 that is to be provided to the platform 303. Subsequently, the configuration client 302 can cycle through the list of client application component types and can issue corresponding secondary inquiries 328 and 332 for each of the application component types defined, in order to retrieve related client configuration data. The responses to the secondary inquiries 328, 332 can contain executable modules for the application components 305A, 305B, 305C. To complete this initial stage, an enumeration 338 of the responses from the configuration client 302 can be returned to the platform 303. The configuration client 302 can convey an instruction to close 336 the communication connection with the configuration server 301 once initialization tasks have been performed.

It should be noted that different application components may need to be installed within the platform 303 in a serial fashion. That is, the installation of particular application components can require other components to have already been installed and/or activated. Therefore, the configuration client 302 can submit instructions to the configuration server 301 detailing an order in which inquires are to be handled. For example, a serialization instruction 326 can specify that inquiry 324 is to be processed before inquiry 328; a serialization instruction 330 can specify that inquiry 328 is to be processed before inquiry 332, and, a serialization instruction 334 can specify that inquiry 328 is to be processed before closing 336 the communication connection.

Turning now to FIG. 3B, the platform 303, using the configuration data, can load and initialize an appropriate platform interface to the loader 304 using the load(PlatformInterface) method 340. Once initialized, the loader 304 can perform a series of communication routines with the configuration client 302. Specifically, the loader 304 can access a getInstance( ) method 342 in order to acquire the particular instance of the configuration client 302. Additionally, the loader 304 can access an addConfigListenter(string) 344 in order to instruct the configuration client 302 to add the loader 304 as a listener/observer. Finally, the loader 304 can access a getConfig(string) method 346 to retrieve the configuration data containing the names of classes to instantiate.

For each of the class names of application components 305A, 305B, 305C listed in the configuration data provided by the configuration server 301 in the inquiries, 324, 328, and 332, the following sequence of events can occur. First, the loader 304 can instantiate 348 the application component 305A, 305B, 305C and can provide to the application component 305A, 305B, 305C a reference to the platform 303 through the setup(reference to Platform) method 350. Subsequently, the application component 305A, 305B, 305C can undergo initialization.

Specifically, in accordance with the two-phased startup and shutdown approach described above, a first phase 352 of the initialization process can follow the completion of the setup(reference to Platform) method 350 in which an existing instance of the application component 305A, 305B, 305C is shutdown and the application component 305A, 305B, 305C is updated. Subsequently, the application component 305A, 305B, 305C can be re-instantiated.

Following the first phase of the initialization 352, the application component 305A, 305B, 305C can establish a communications link with the configuration client 302. In particular, the application component 305A, 305B, 305C can access a getInstance( ) method 354 in order to acquire the particular instance of the configuration client 302. Additionally, the application component 305A, 305B, 305C can access an addConfigListenter(string) 356 in order to instruct the configuration client 302 to add the application component 305A, 305B, 305C as a listener/observer. Finally, the application component 305A, 305B, 305C can access a getConfig(string) method 358 to retrieve the configuration data for the particular instance of the application component 305A, 305B, 305C.

Subsequently, the application component 305A, 305B, 305C can register with the platform 303 using a register( ) function 360. Following registration, the loader 304 can begin the execution of the application component 305A, 305B, 305C using the start method 362. Additionally, the application component 305A, 305B, 305C can subscribe to the platform 303 for future updates using a subscribe( )

method 364. In particular, the subscribe( ) method 364 can ensure that the application component 305A, 305B, 305C will be notified of future component and/or configuration updates. Following the subscription process, the application component 305A, 305B, 305C can begin a second and final initialization phase 366 of the two-phased startup and shutdown process. When initialization has completed, the loader 304 can activate the updated application component 305A, 305B, 305C using the activate( ) function 368.

Notably, the present invention can be realized in hardware, software, or a combination of hardware and software. The method of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

The invention claimed is:

1. A method for distributing realtime updates to active application components in an active client position, comprising:
when said client position undergoes a bootstrap procedure, instantiating in the client position a loader and a configuration client;
reading a bootstrap properties file containing a resource locator of a configuration server and a position identifier;
establishing a first communications connection between a platform managing the active application components and said configuration client;
establishing a second communications connection between said configuration client and a configuration server;
performing by the configuration client an initial query of said configuration server using the position identifier as a search argument, and in response to the initial query receiving a list of application components to be updated;
based upon said list, performing by the configuration client at least one secondary query over said second communications connection, and in response to said at least one secondary query receiving at least one executable module and configuration data for a corresponding application component, and when necessary for execution of the corresponding application component, at least one server address;
delivering updates to said configuration client over said second communications connection in response to said at least one secondary query, wherein each update corresponds to at least one particular application component;
notifying said platform that updates are available; and
delivering each said update over said first communications connection to said platform, applying each said update to said at least one corresponding application component, and re-executing each said updated application component.

2. The method of claim 1, further comprising terminating execution of said particular active application components in response to said notification, wherein said terminating comprises terminating instances of each said identified application component before said instances self-terminate and removing interdependencies between said terminated application component instances and other application components, and wherein said terminating step further comprises identifying at least one particular corresponding application component to be updated based on said notification.

3. The method according to claim 1, wherein said re-executing step comprises:
instantiating each said updated application component; and
initializing each said updated application component instance.

4. The method according to claim 3, wherein said initializing step comprises:
communicating configuration information to said configuration client; and
reinitializing state information internal to each said updated application component based on said configuration information.

5. The method according to claim 3, further comprising requesting from said configuration client update notifications, said update notifications notifying said platform of application component updates as said updates become available in said configuration server.

6. The method according to claim 1, further comprising the step of transmitting update notifications over said second communications connection to said configuration client, said update notifications notifying said configuration client of application component updates as said updates become available in said configuration server.

7. The method according to claim 6, wherein said step of transmitting update notifications over said second connection, comprises the steps of:
packetizing said update notifications within a datagram; and
transmitting said datagram to said configuration client.

8. The method according to claim 1, wherein said configuration server is an LDAP server.

9. The method according to claim 8, further comprising storing said application component updates in an LDAP-based database in said LDAP server.

10. A system for updating active client positions comprising:
a platform for managing active application components;
a configuration server for storing updates; and
a configuration client for receiving client-specific updates from said configuration server and communicating said received updates to said platform;

wherein said platform instantiates said configuration client when a client position in which said platform is disposed undergoes a bootstrap process, said bootstrap process also instantiating in the client position a loader;

wherein said configuration client, upon instantiation,
reads a bootstrap properties file containing a resource locator of said configuration server and a client position identifier;

establishes a first communications connection between said platform and said configuration client, establishes a second communications connection between said configuration client and said configuration server;

performs an initial query of said configuration server using the position identifier as a search argument, and in response to the initial query, receives a list of application components to be updated;

performs at least one secondary query based upon said list, and in response to said at least one secondary query, receives at least one executable module and configuration data for a corresponding application component, and when necessary for execution of the corresponding application component, at least one server address;

receives updates to said configuration client over said second communications connection in response to said at least one secondary query;

notifies said platform that updates are available; and delivers each said update over said first communications connection to said platform.

11. The system of claim 10, wherein said configuration client further comprises:
a notifier object and a listener interface,
wherein said active application components are configured to receive update notifications from said configuration client through said listener interface.

12. The system of claim 10, wherein said configuration server further comprises:
a notifier object and a listener interface,
wherein said configuration client is configured to receive update notifications from said configuration server through said listener interface.

13. A machine readable storage, having stored thereon a computer program having a plurality of code sections for distributing realtime updates to active application components in an active client position, said code sections executable by a machine for causing the machine to perform the steps of:

instantiating in said client position a loader and a configuration client when said client position undergoes a bootstrap procedure;

reading a bootstrap properties file containing a resource locator of a configuration server and a position identifier;

establishing a first communications connection between a platform managing the active application components and said configuration client;

establishing a second communications connection between said configuration client and a configuration server;

performing by the configuration client an initial query of said configuration server using the position identifier as a search argument, and in response to the initial query receiving a list of application components to be updated;

based upon said list, performing by the configuration client at least one secondary query over said second communications connection, and in response to said at least one secondary query receiving at least one executable module and configuration data for a corresponding application component, and when necessary for execution of the corresponding application component, at least one server address;

delivering updates to said configuration client over said second communications connection in response to said at least one query, wherein each update corresponds to at least one particular application component;

notifying said platform that updates are available; and delivering each said update over said first communications connection to said platform, applying each said update to said at least one corresponding application component, and re-executing each said updated application component.

14. The machine readable storage of claim 13, further comprising terminating execution of said particular active application components in response to said notification, wherein said terminating comprises terminating instances of each said identified application component before said instances self-terminate and removing interdependencies between said terminated application component instances and other application components, and wherein said terminating step further comprises identifying at least one particular corresponding application component to be updated based on said notification.

15. The machine readable storage of claim 13, wherein said re-executing step comprises:
instantiating each said updated application component; and
initializing each said updated application component instance.

16. The machine readable storage of claim 15, wherein said initializing step comprises:
communicating configuration information to said configuration client; and
reinitializing state information internal to each said updated application component based on said configuration information.

17. The machine readable storage of claim 15, further comprising requesting from said configuration client update notifications, said update notifications notifying said platform of application component updates as said updates become available in said configuration server.

18. The machine readable storage of claim 13, further comprising the step of transmitting update notifications over said second communications connection to said configuration client, said update notifications notifying said configuration client of application component updates as said updates become available in said configuration server.

19. The machine readable storage of claim 18, wherein said step of transmitting update notifications over said second connection, comprises the steps of:
packetizing said update notifications within a datagram; and
transmitting said datagram to said configuration client.

20. The machine readable storage of claim 13, wherein said configuration server is an LDAP server.

21. The machine readable storage of claim 20, further comprising storing said application component updates in an LDAP-based database in said LDAP server.

22. A method for distributing realtime updates to active application components executing in an active client position, comprising:

when said client position undergoes a bootstrap procedure, instantiating in the client position a loader and a configuration client;

reading a bootstrap properties file containing a resource locator of a configuration server and a position identifier;

performing an initial query of a configuration server using the position identifier as a search argument, and in response to the initial query receiving a list of application components to be updated;

based upon said list, performing at least one secondary query, and in response to said at least one secondary query receiving at least one executable module and configuration data for a corresponding application component, and when necessary for execution of the corresponding application component, at least one server address;

receiving updates to the active application components from said configuration client in response to said at least one secondary query from the active client position, each update corresponding to at least one particular application component;

terminating execution of each particular active application component having a received corresponding update;

applying said received updates to said corresponding application components; and, re-executing said updated application components.

23. The method according to claim 22, wherein said re-executing step comprises:

instantiating each updated application component; and initializing each updated application component instance.

24. The method according to claim 22, further comprising subscribing to update notifications from said configuration client, said update notifications notifying the active client position of application component updates as said updates become available.

25. A machine readable storage, having stored thereon a computer program having a plurality of code sections for distributing realtime updates to active application components executing in an active client position, said code sections executable by a machine for causing the machine to perform the steps of:

when said client position undergoes a bootstrap procedure, instantiating in the client position a loader and a configuration client;

reading a bootstrap properties file containing a resource locator of a configuration server and a position identifier;

performing an initial query of a configuration server using the position identifier as a search arguments and in response to the initial query receiving a list of application components to be updated;

based upon said list, performing at least one secondary query and in response to said at least one secondary query receiving at least one executable module and configuration data for a corresponding application component, and when necessary for execution of the corresponding application component, at least one server address;

receiving updates to the active application components from said configuration client in response to said at least one query from the active client position, each update corresponding to at least one particular application component;

terminating execution of each particular active application component having a received corresponding update;

applying said received updates to said corresponding application components; and, re-executing said updated application components.

26. The machine readable storage of claim 25, wherein said re-executing step comprises:

instantiating each updated application component; and initializing each updated application component instance.

27. The machine readable storage of claim 25, further comprising subscribing to update notifications from said configuration client, said update notifications notifying the active client position of application component updates as said updates become available.

* * * * *